US012775831B2

(12) United States Patent
Chen et al.

(10) Patent No.: US 12,775,831 B2
(45) Date of Patent: Oct. 27, 2026

(54) OPTICAL CIRCUIT SYSTEMS AND OPTICAL COMMUNICATION METHOD

(71) Applicant: MACRONIX INTERNATIONAL CO., LTD., Hsinchu (TW)

(72) Inventors: Kuan-Chih Chen, New Taipei City (TW); Ming-Hsiu Lee, Hsinchu City (TW)

(73) Assignee: MACRONIX INTERNATIONAL CO., LTD., Hsinchu (TW)

( * ) Notice: Subject to any disclaimer, the term of this patent is extended or adjusted under 35 U.S.C. 154(b) by 252 days.

(21) Appl. No.: 18/736,655

(22) Filed: Jun. 7, 2024

(65) Prior Publication Data

US 2025/0378319 A1 Dec. 11, 2025

(51) Int. Cl.
*G06N 3/067* (2006.01)
*G02F 3/00* (2006.01)

(52) U.S. Cl.
CPC ............. *G06N 3/0675* (2013.01); *G02F 3/00* (2013.01)

(58) Field of Classification Search
CPC ............................. G06N 3/0675; G06N 3/067
See application file for complete search history.

(56) References Cited

U.S. PATENT DOCUMENTS

2017/0351293 A1* 12/2017 Carolan .................. G02F 1/225
2020/0327403 A1 10/2020 Du
2023/0259753 A1 8/2023 Park
2025/0247155 A1* 7/2025 Yu ........................ H04B 10/524
2026/0029815 A1* 1/2026 Shen ....................... G06E 3/005

* cited by examiner

*Primary Examiner* — Paisley L Wilson
(74) *Attorney, Agent, or Firm* — McClure, Qualey & Rodack, LLP

(57) ABSTRACT

An optical circuit system comprising a laser projecting device, a first optical device group and a second optical device group and configured to perform a neural network computing is provided. The laser projecting device generates multiple standard optical signals. The first optical device group comprises multiple first optical devices. Each first optical device has a transparency parameter and generates multiple first optical signals based on the received standard optical signals and the transparency parameter. The second optical device group comprises multiple second optical devices. Each second optical device has multiple transparency parameters and generates multiple second optical signals based on the received first optical signals and the transparency parameters, thereby generating a combined optical signal. The light intensity of the first/second optical signals generated by one of the first/second optical devices is related to one of multiple neuronal data of a first/second level of a neural network.

20 Claims, 9 Drawing Sheets

OPTICAL CIRCUIT SYSTEMS AND OPTICAL COMMUNICATION METHOD

BACKGROUND

Technical Field

The present disclosure is related to the computing technology of neural networks. More particularly, the present disclosure is related to optical circuit systems and optical communication methods that implement the computing of neural networks with optical communication technology.

Description of Related Art

With the development of machine learning and artificial intelligence (AI) technology, how to implement the computing of neural networks with circuits has become the focus of attention. Although a lot of circuits able to implement the computing of neural networks have been proposed, in these circuits connected through multiple conductive lines, due to the effect of RC delay, signals in the circuit will be delayed. Moreover, resistors added to implement neural networks also reduce the energy efficiency of the circuit.

In addition, since the nodes in neural networks need to be updated frequently during the training process, the circuit components need to maintain normal operation for a long time to ensure that the result of training is correct. Therefore, the reliability and durability of circuit components have also become one of the bottlenecks in implementing neural networks with traditional circuits.

In conclusion, how to improve the reliability of the circuit and reduce the delay of signals without greatly reducing the energy efficiency of the circuit is one of the topics in this field.

SUMMARY

An aspect of an optical circuit system is provided in the present disclosure. The optical circuit system is configured to perform a neural network computing and comprises a laser projecting device, a first optical device group and a second optical device group. The laser projecting device is configured to generate a plurality of standard optical signals. The first optical device group comprises a plurality of first optical devices and is configured to receive the plurality of standard optical signals from the laser projecting device. Each of the plurality of first optical devices has a transparency parameter and is configured to generate a plurality of first optical signals based on the plurality of standard optical signals and the transparency parameter. The second optical device group comprises a plurality of second optical devices and is configured to receive the plurality of first optical signals from the first optical device group. Each of the plurality of second optical devices has a plurality of transparency parameters and is configured to generate a plurality of second optical signals based on the plurality of first optical signals and the plurality of transparency parameters, thereby generating a combined optical signal. The light intensity of the plurality of first optical signals generated by one of the plurality of first optical devices is related to one of a plurality of neuronal data of a first level of a neural network, and the light intensity of the plurality of second optical signals generated by one of the plurality of second optical devices is related to one of a plurality of neuronal data of a second level of the neural network.

In some embodiments of this aspect of the optical circuit system, the plurality of transparency parameters of the plurality of first optical devices are different from each other, and the transparency parameters of any one of the plurality of second optical devices are different from each other.

In some embodiments of this aspect of the optical circuit system, the optical circuit system further comprises a power supply device. The power supply device is coupled to the plurality of first optical devices and the plurality of second optical devices, and is configured to provide a plurality of supply voltages to the plurality of first optical devices and the plurality of second optical devices respectively, so as to adjust the plurality of transparency parameters of the plurality of first optical devices and the plurality of second optical devices.

In some embodiments of this aspect of the optical circuit system, each of the plurality of second optical devices comprises an optical combiner device configured to generate the combined optical signal based on the plurality of second optical signals of the one of the plurality of second optical devices.

In some embodiments of this aspect of the optical circuit system, the light intensity of the combined optical signal is related to a sum of the light intensities of the plurality of second optical signals generated by the one of the plurality of second optical devices, and the sum of the light intensities of the plurality of second optical signals is equal to a sum of the products of the light intensities of the plurality of first optical signals and the plurality of transparency parameters of the one of the plurality of second optical devices respectively.

In some embodiments of this aspect of the optical circuit system, the laser projecting device is further configured to generate a direct optical signal to the optical combiner device. The light intensity of the combined optical signal is related to a sum of the light intensities of the plurality of second optical signals generated by the one of the plurality of second optical devices, and the sum of the light intensities of the plurality of second optical signals is equal to a sum of the light intensity of the direct optical signal and the products of the light intensities of the plurality of first optical signals and the plurality of transparency parameters of the one of the plurality of second optical devices respectively.

In some embodiments of this aspect of the optical circuit system, the optical combiner device and the power supply device are coupled to a computing device, and the computing device is configured to generate a control command to the power supply device based on the combined optical signal, so as to adjust the plurality of supply voltages.

Another aspect of an optical circuit system is provided in the present disclosure. The optical circuit system is configured to perform a neural network computing and comprises a first level sub-system and a second level sub-system. The second level sub-system is coupled to the first level sub-system. Each of the first level sub-system and the second level sub-system comprises a laser projecting device, a first optical device group and a second optical device group. The laser projecting device is configured to generate a plurality of standard optical signals. The first optical device group comprises a plurality of first optical devices and is configured to receive the plurality of standard optical signals from the laser projecting device. Each of the plurality of first optical devices has a transparency parameter and is configured to generate a plurality of first optical signals based on the plurality of standard optical signals and the transparency parameter. The second optical device group comprises a plurality of second optical devices and is configured to receive the plurality of first optical signals from the first optical device group. Each of the plurality of second optical devices has a plurality of transparency parameters and is configured to generate a plurality of second optical signals based on the plurality of first optical signals and the plurality of transparency parameters, thereby generating a combined optical signal. The light intensity of the plurality of first optical signals generated by the plurality of first optical devices of the second level sub-system is related to the light intensity of the plurality of second optical signals generated by the plurality of second optical devices of the first level sub-system. The light intensity of the plurality of first optical signals generated by one of the plurality of first optical devices of the first level sub-system is related to one of a plurality of neuronal data of a first level of a neural network. The light intensity of the plurality of second optical signals generated by one of the plurality of second optical devices of the first level sub-system and the light intensity of the plurality of first optical signals generated by one of the plurality of first optical devices of the second level sub-system are related to one of a plurality of neuronal data of a second level of the neural network. The light intensity of the plurality of second optical signals generated by one of the plurality of second optical devices of the second level sub-system is related to one of a plurality of neuronal data of a third level of the neural network.

In some embodiments of this another aspect of the optical circuit system, the plurality of transparency parameters of the plurality of first optical devices of the first level sub-system are different from each other, the transparency parameters of the plurality of first optical devices of the second level sub-system are different from each other, the transparency parameters of any one of the plurality of second optical devices of the first level sub-system are different from each other, and the transparency parameters of any one of the plurality of second optical devices of the second level sub-system are different from each other.

In some embodiments of this another aspect of the optical circuit system, each of the first level sub-system and the second level sub-system comprises a power supply device. The power supply device is coupled to the plurality of first optical devices and the plurality of second optical devices, and is configured to provide a plurality of supply voltages to the plurality of first optical devices and the plurality of second optical devices respectively, so as to adjust the plurality of transparency parameters of the plurality of first optical devices and the plurality of second optical devices.

In some embodiments of this another aspect of the optical circuit system, each of the plurality of second optical devices of the first level sub-system and the second level sub-system comprises an optical combiner device configured to generate the combined optical signal based on the plurality of second optical signals of the one of the plurality of second optical devices.

In some embodiments of this another aspect of the optical circuit system, the light intensity of the combined optical signal is related to a sum of the light intensities of the plurality of second optical signals generated by the one of the plurality of second optical devices, and the sum of the light intensities of the plurality of second optical signals is equal to a sum of the products of the light intensities of the plurality of first optical signals and the plurality of transparency parameters of the one of the plurality of second optical devices respectively.

In some embodiments of this another aspect of the optical circuit system, the laser projecting device of the first level sub-system and the second level sub-system is further configured to generate a direct optical signal to the optical combiner device. The light intensity of the combined optical signal is related to a sum of the light intensities of the plurality of second optical signals generated by the one of the plurality of second optical devices, and the sum of the light intensities of the plurality of second optical signals is equal to a sum of the light intensity of the direct optical signal and the products of the light intensities of the plurality of first optical signals and the plurality of transparency parameters of the one of the plurality of second optical devices respectively.

In some embodiments of this another aspect of the optical circuit system, the optical combiner device of the first level sub-system and the power supply device of the second level sub-system are coupled to a computing device, and the computing device is configured to generate a control command to the power supply device of the second level sub-system based on the combined optical signal of the optical combiner device of the first level sub-system, so as to adjust the plurality of supply voltages of the second level sub-system.

An optical communication method configured to control an optical circuit system to perform a neural network computing is provided in the present disclosure. The optical communication method comprises: generating, by a laser projecting device of the optical circuit system, a plurality of standard optical signals; receiving, by a plurality of first optical devices of a first optical device group of the optical circuit system, the plurality of standard optical signals, wherein each of the plurality of first optical devices has a transparency parameter; generating, by the plurality of first optical devices, a plurality of first optical signals based on the plurality of standard optical signals and the transparency parameter; receiving, by a plurality of second optical devices of a second optical device group of the optical circuit system, the plurality of first optical signals, wherein each of the plurality of second optical devices has a plurality of transparency parameters; generating, by the plurality of second optical devices, a plurality of second optical signals based on the plurality of first optical signals and the plurality of transparency parameters; and generating, by the plurality of second optical devices, a plurality of combined optical signals based on the plurality of second optical signals. The light intensity of the plurality of first optical signals generated by one of the plurality of first optical devices is related to one of a plurality of neuronal data of a first level of a neural network, and the light intensity of the plurality of second optical signals generated by one of the plurality of second optical devices is related to one of a plurality of neuronal data of a second level of the neural network.

In some embodiments of the optical communication method, the optical communication method further comprises: providing, by a power supply device of the optical circuit system, a plurality of supply voltages to the plurality of first optical devices and the plurality of second optical devices respectively, so as to adjust the plurality of transparency parameters of the plurality of first optical devices and the plurality of second optical devices.

In some embodiments of the optical communication method, generating, by the plurality of second optical devices, the plurality of combined optical signals, based on the plurality of second optical signals comprises: receiving, by an optical combiner device of each second optical device, the plurality of second optical signals; and summing up, by the optical combiner device, the light intensities of the plurality of second optical signals, so as to generate the plurality of combined optical signals. A sum of the light intensities of the plurality of second optical signals is equal to a sum of the products of the light intensities of the plurality of first optical signals and the plurality of transparency parameters of the one of the plurality of second optical devices respectively.

In some embodiments of the optical communication method, the optical communication method further comprises: generating, by the laser projecting device, a direct optical signal to an optical combiner device of the plurality of second optical devices. Generating, by the plurality of second optical devices, the plurality of combined optical signals, based on the plurality of second optical signals comprises: receiving, by the optical combiner device of each second optical device, the plurality of second optical signals and the direct optical signal; and summing up, by the optical combiner device, the light intensities of the plurality of second optical signals and the light intensity of the direct optical signal, so as to generate the plurality of combined optical signals. A sum of the light intensities of the plurality of second optical signals is equal to a sum of the products of the light intensities of the plurality of first optical signals and the plurality of transparency parameters of the one of the plurality of second optical devices respectively.

In some embodiments of the optical communication method, the optical communication method further comprises: generating, by a computing device coupled to the optical circuit system, a control command based on the plurality of combined optical signals, to the power supply device; and adjusting, by the power supply device, the plurality of supply voltages based on the control command.

In some embodiments of the optical communication method, the optical communication method further comprises: generating, by a computing device coupled to the optical circuit system, a control command based on the plurality of combined optical signals, to the power supply device; adjusting, by the power supply device, the plurality of supply voltages that are provided to a third optical device group and a fourth optical device group of the optical circuit system based on the control command; receiving, by a plurality of third optical devices of the third optical device group, the plurality of supply voltages and the plurality of standard optical signals, so as to generate a plurality of third optical signals; and receiving, by a plurality of fourth optical devices of the fourth optical device group, the plurality of third optical signals and the plurality of supply voltages, so as to generate a plurality of fourth optical signals. The light intensity of the plurality of third optical signals is related to the plurality of combined optical signals, and related to the one of the plurality of neuronal data of the second level of the neural network. The light intensity of the plurality of fourth optical signals is related to the one of a plurality of neuronal data of a third level of the neural network.

With the optical circuit systems and optical communication method in the present disclosure, the traditional circuits connected through multiple conductive lines can be replaced by optical circuits to implement the computing of neural networks. Due to the characteristics of optical circuits, the optical circuit systems and optical communication method in the present disclosure can improve the reliability of the circuit and reduce the delay of signals without greatly reducing the energy efficiency of the circuit, and can further simplify the routing of the circuit and reduce design complexity.

It should be understood that both the foregoing general description and the following detailed description are by examples, and are intended to provide further explanation of the disclosure as claimed.

BRIEF DESCRIPTION OF THE DRAWINGS

The present disclosure can be more fully understood by reading the following detailed description of the embodiment, with reference made to the accompanying drawings as follows.

DETAILED DESCRIPTION

Reference will now be made in detail to the present embodiments of the disclosure, examples of which are illustrated in the accompanying drawings.

In the present disclosure, when an element is referred to as "connected", it may mean "electrically connected" or "optical connected". When an element is referred to as "coupled", it may mean "electrically coupled" or "optical coupled". "Connected" or "coupled" can also be used to indicate that two or more components operate or interact with each other. As used in the present disclosure, the singular forms "a", "one" and "the" are also intended to include plural forms, unless the context clearly indicates otherwise. It will be further understood that when used in this specification, the terms "comprises (comprising)" and/or "includes (including)" designate the existence of stated features, steps, operations, elements and/or components, but the existence or addition of one or more other features, steps, operations, elements, components, and/or groups thereof are not excluded.

Figure 1:
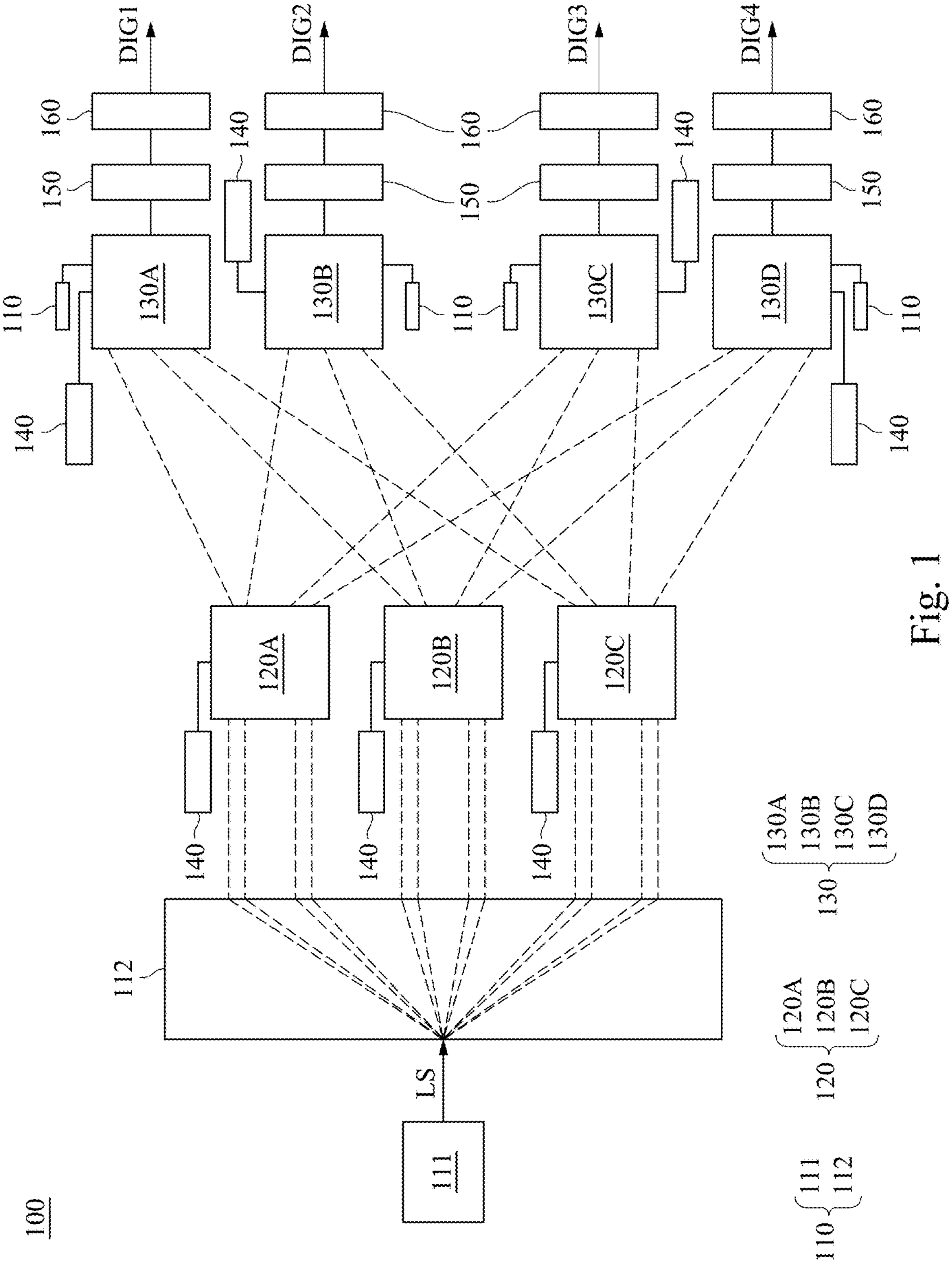
FIG. 1 is a functional block diagram of an optical circuit system in accordance with some embodiments of the present disclosure.

FIG. 1 is a functional block diagram of an optical circuit system 100 in accordance with some embodiments of the present disclosure. The optical circuit system 100 is configured to assist neural networks in performing computing. In some embodiments, the optical circuit system 100 comprises a laser projecting device 110, a first optical device group 120, a second optical device group 130, a power supply device 140, a non-linear optical device 150 and an optical receiver device 160.

For the sake of clarity, the optical signals in FIG. 1 are shown as dotted lines, and the signals other than the optical signals (e.g., voltage signals) are shown as solid lines. In some embodiments, the transmission paths of the optical signals (i.e., the dotted lines in FIG. 1) may be air, glass or other transparent media.

The laser projecting device 110 is optically coupled to the first optical device group 120. Specifically, the laser projecting device 110 communicates with the first optical device group 120 by transmitting optical signals to the first optical device group 120. In some embodiments, the laser projecting device 110 comprises a laser generator 111 and a beam splitter 112. The laser generator 111 is configured to generate a laser signal LS to the beam splitter 112. The beam splitter 112 is configured to receive the laser signal LS from the laser generator 111 and generate a plurality of standard optical signals OS_S (labeled in FIG. 2A) to the first optical device group 120.

The first optical device group 120 is optically coupled to the laser projecting device 110 and the second optical device group 130, and is coupled to the power supply device 140. In some embodiments, the first optical device group 120 comprises first optical devices 120A, 120B and 120C. The structure of each first optical device will be further described in FIG. 2A.

Figure 2A:
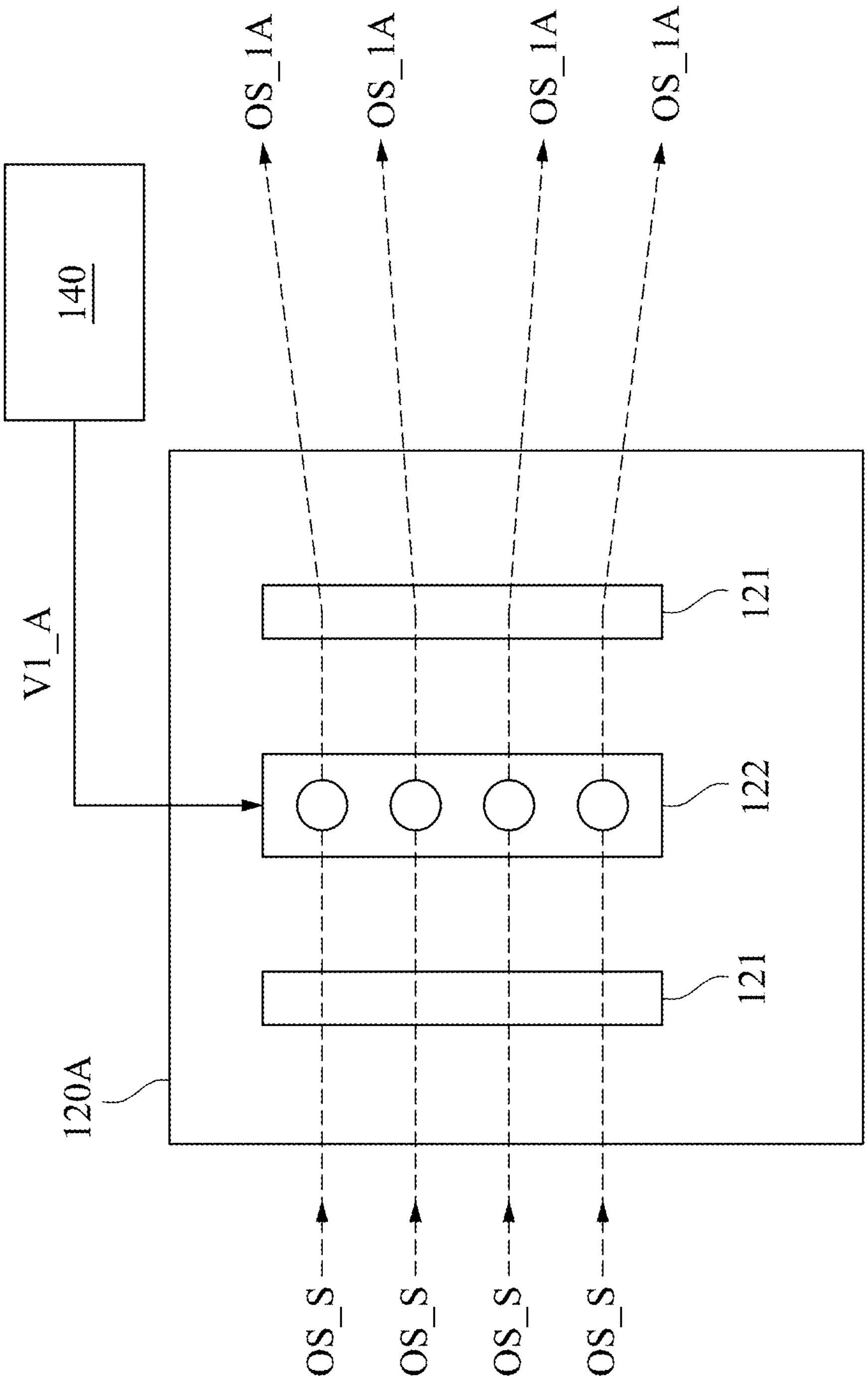
FIG. 2A is a schematic diagram of a first optical device in accordance with some embodiments of the present disclosure.

Since the structures and operations of the first optical devices 120A, 120B and 120C are similar, for the sake of brevity, only the structure and operation of the first optical device 120A will be shown in FIG. 2A. FIG. 2A is a schematic diagram of the first optical device 120A in accordance with some embodiments of the present disclosure. In some embodiments, the first optical device 120A comprises an optical steering device 121 and an electro-optic modulator 122.

The optical steering device 121 is located on both sides of the electro-optic modulator 122 and is configured to control the optical signals (e.g., change the direction, adjust the phase, etc.). In some embodiments, the optical steering device 121 can be implemented with transform lenses, optical phase arrays, grating couplers, photonic crystals, other similar optical components or any combination of the above.

The electro-optic modulator 122 is optically coupled to the optical steering device 121 and coupled to the power supply device 140, and is configured to receive the standard optical signals OS_S from the optical steering device 121, receive a supply voltage V1_A from the power supply device 140, and generate first optical signals OS_1A based on the standard optical signals OS_S and the supply voltage V1_A. In some embodiments, the electro-optic modulator 122 can be implemented with electrochromic glass, absorption modulators, light valves, other similar optical components or any combination of the above.

Specifically, first, the optical steering device 121 receives the plurality of standard optical signals OS_S from the laser projecting device 110 and controls these standard optical signals OS_S, so as to transmit the standard optical signals OS_S to the electro-optic modulator 122. Next, the electro-optic modulator 122 generates the first optical signals OS_1A to the optical steering device 121 on the other side based on the standard optical signals OS_S and the supply voltage V1_A. Finally, the optical steering device 121 on the other side controls the first optical signals OS_1A, so that the first optical signals OS_1A can be transmitted to the second optical device group 130.

In some embodiments, the light intensity of the first optical signal OS_1A generated by the electro-optic modulator 122 is related to the transparency parameter of the electrochromic glass of the electro-optic modulator 122 (shown as circular patterns in the electro-optic modulator 122 in FIG. 2A), and this transparency parameter is related to the voltage received by the electrochromic glass.

Figure 2B:
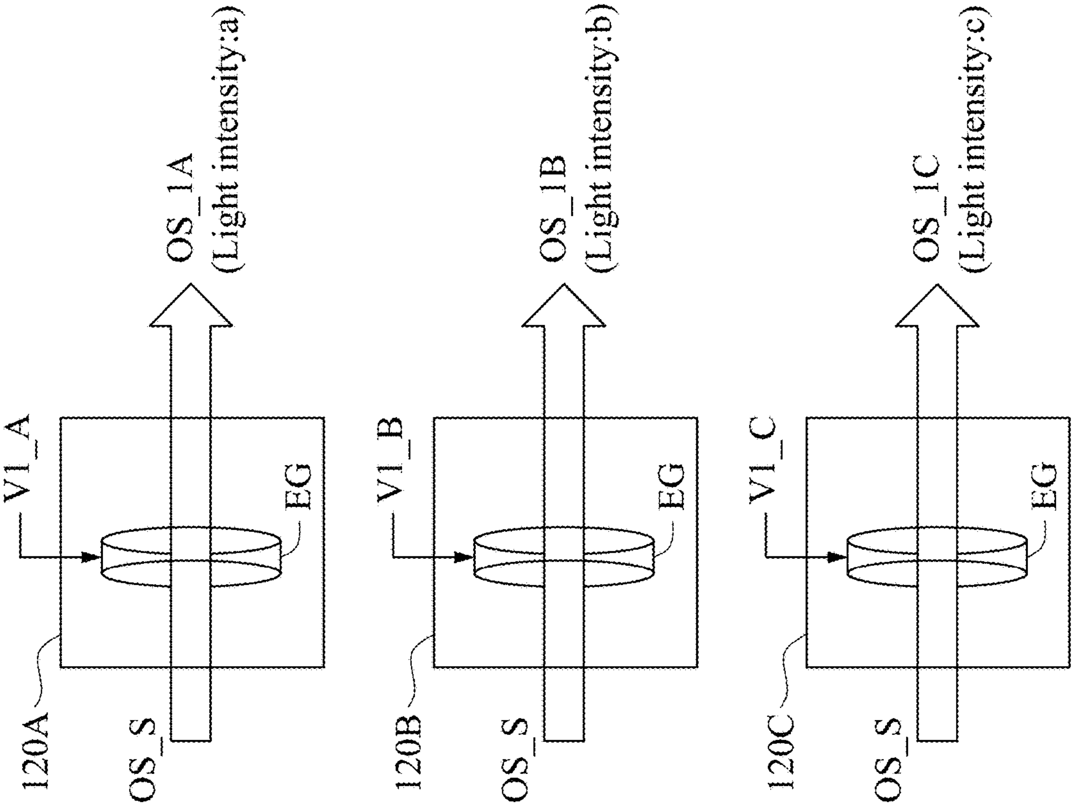
FIG. 2B is a schematic diagram of a first optical device group generating first optical signals in accordance with some embodiments of the present disclosure.

Please refer further to FIG. 2B. FIG. 2B is a schematic diagram of the first optical device group 120 generating the first optical signals OS_1A, OS_1B and OS_1C in accordance with some embodiments of the present disclosure. It should be noted that for the sake of brevity, only one electrochromic glass EG is shown in each of the first optical devices 120A, 120B and 120C, and components other than the electrochromic glass EG are omitted.

Operationally, the power supply device 140 transmits the supply voltages V1_A, V1_B and V1_C to the plurality of electrochromic glass EG in the first optical devices 120A, 120B and 120C respectively, so that the first optical devices 120A, 120B and 120C respectively generate the first optical signals OS_1A, OS_1B and OS_1C with the light intensities of a, b and c.

In some embodiments, the supply voltages V1_A, V1_B and V1_C are different from each other. In other words, the transparency parameters of the plurality of electrochromic glass EG in the first optical devices 120A, 120B and 120C are different from each other. In some embodiments, the plurality of electrochromic glass in the same first optical device receive the same supply voltage. For example, the four electrochromic glass EG in the first optical device 120A in FIG. 2A all receive the same supply voltage V1_A, and therefore four identical first optical signals OS_1A are generated.

Please refer to FIG. 1 again. The second optical device group 130 is optically coupled to the first optical device group 120, and is coupled to the laser projecting device 110, the power supply device 140 and the non-linear optical device 150. In some embodiments, the second optical device group 130 comprises second optical devices 130A, 130B, 130C and 130D. The structure of each second optical device will be described in FIG. 3A.

Figure 3A:
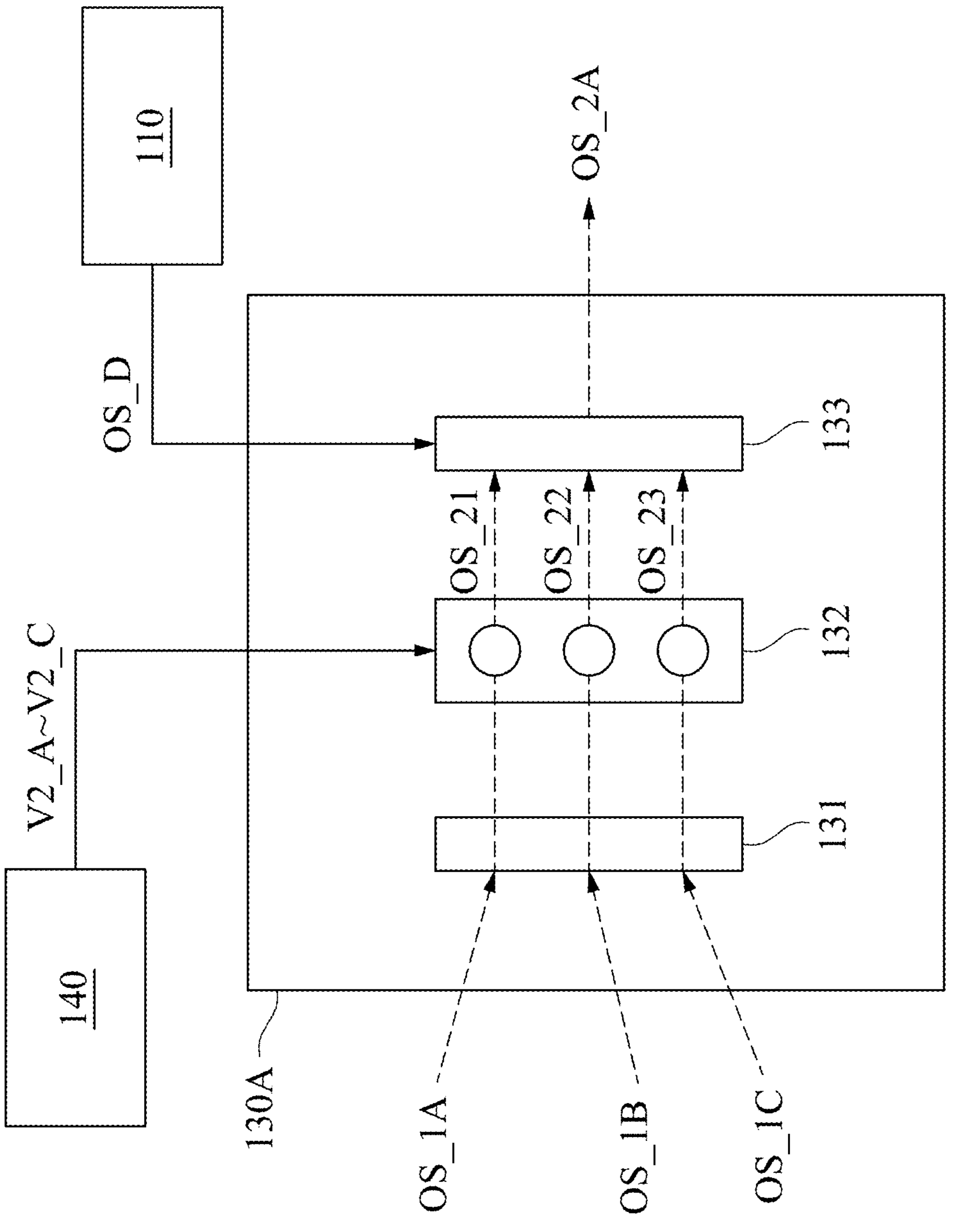
FIG. 3A is a schematic diagram of a second optical device in accordance with some embodiments of the present disclosure.
Figure 3B:
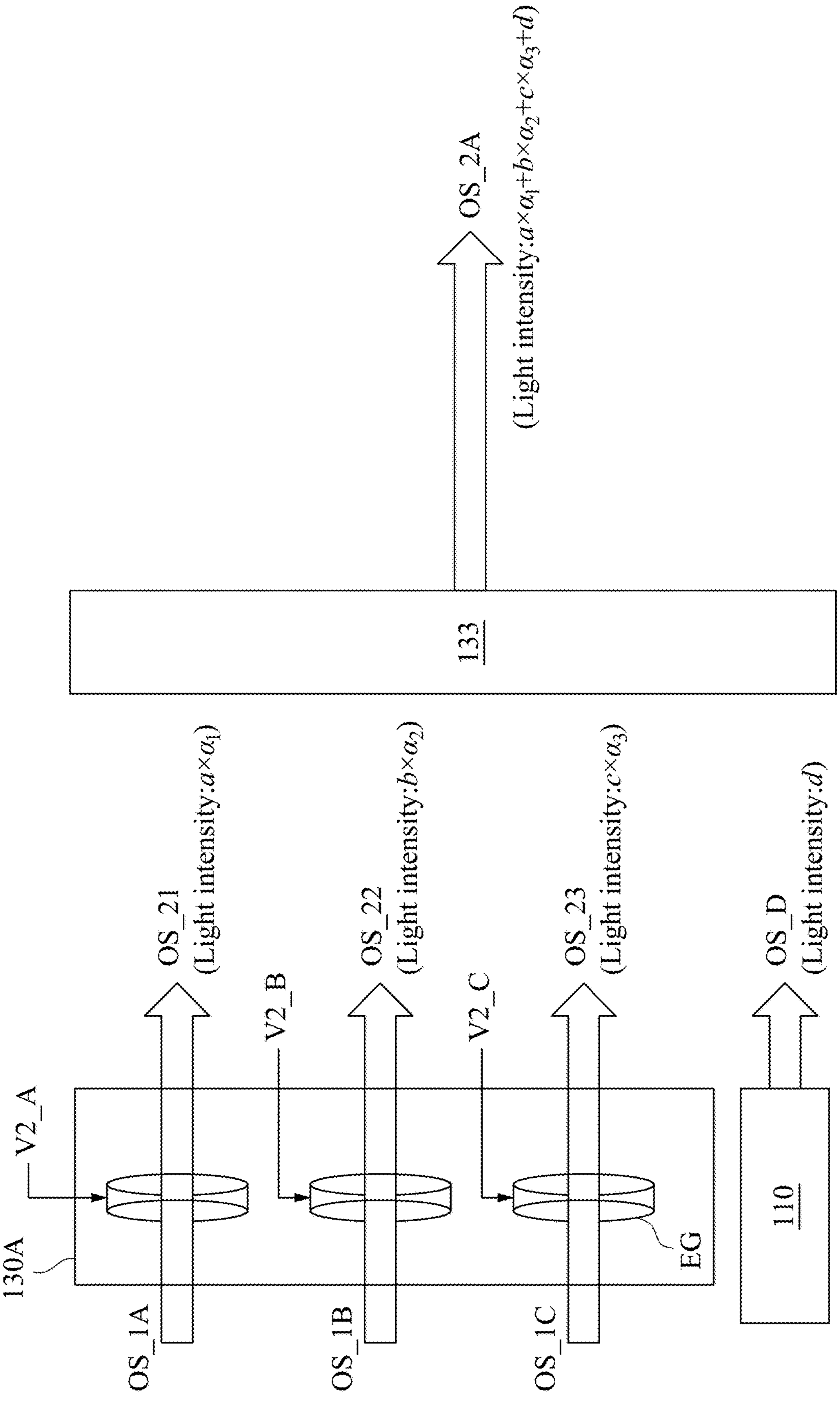
FIG. 3B is a schematic diagram of the second optical device generating second optical signals in accordance with some embodiments of the present disclosure.

Since the structures and operations of the second optical devices 130A, 130B, 130C and 130D are similar, for the sake of brevity, only the structure and operation of the second optical device 130A will be shown in FIGS. 3A-3B. FIG. 3A is a schematic diagram of the second optical device 130A in accordance with some embodiments of the present disclosure. In some embodiments, the second optical device 130A comprises an optical steering device 131, an electro-optic modulator 132 and an optical combiner device 133.

The optical steering device 131 is optically coupled to the electro-optic modulator 132, and is configured to receive the first optical signals OS_1A, OS_1B and OS_1C and transmit them to the electro-optic modulator 132. The electro-optic modulator 132 is optically coupled to the optical steering device 131, the optical combiner device 133 and the power supply device 140, and is configured to receive the controlled first optical signals OS_1A, OS_1B and OS_1C from the optical steering device 131, receive supply voltages V2_A-V2_C from the power supply device 140, and generate second optical signals OS_21-OS_23 based on the first optical signals OS_1A, OS_1B and OS_1C and the supply voltages V2_A-V2_C.

The optical combiner device 133 is optically coupled to the electro-optic modulator 132 and coupled to the laser projecting device 110, and is configured to receive the second optical signals OS_21-OS_23 and a direct light signal OS_D from the electro-optic modulator 132 and the laser projecting device 110 respectively, so as to generate a combined optical signal OS_2A.

Similar to the electro-optic modulator 122 of the first optical device 120A, the light intensities of the second optical signals OS_21-OS_23 generated by the electro-optic modulator 132 of the second optical device 130A are also related to the transparency parameters of the plurality of electrochromic glass in the electro-optic modulator 132 (shown as circular patterns in the electro-optic modulator 132 in FIG. 3A), and these transparency parameters are also related to the voltages received by the plurality of electrochromic glass. However, the difference between the electro-optic modulator 132 and the electro-optic modulator 122 is that the plurality of electrochromic glass in the electro-optic modulator 132 receive different supply voltages and therefore have different transparency parameters (i.e., the electro-optic modulator 132 has a plurality of transparency parameters).

Please refer further to FIG. 3B. FIG. 3B is a schematic diagram of the second optical device 130A generating the second optical signals OS_21-OS_23 in accordance with some embodiments of the present disclosure. Operationally, the power supply device 140 transmits different supply voltages V2_A, V2_B and V2_C to the three electrochromic glass EG in the second optical device 130A, so that these three electrochromic glass EG respectively have different transparency parameters and then generate the second optical signals OS_21, OS_22 and OS_23 with light intensities of $a*\alpha1$, $b*\alpha2$ and $c*\alpha3$ to the light combiner device 133, based on their respective transparency parameters and the first optical signals OS_1A, OS_1B and OS_1C. In addition, the laser projecting device 110 may also generate a direct light signal OS_D with the light intensity of d to the optical combiner device 133. Finally, the optical combiner device 133 generates the combined optical signal OS_2A with the light intensity of $a*\alpha1+b*\alpha2+c*\alpha3+d$ based on the received second optical signals OS_21, OS_22 and OS_23 and the direct light signal OS_D.

In some embodiments, the laser projecting device 110 may not be coupled to the optical combiner device 133. In other words, the optical combiner device 133 may not receive the direct light signal OS_D. Take the instance in FIG. 3B as an example, when the light combiner device 133 does not receive the direct light signal OS_D, the light intensity of the generated combined light signal OS_2A will be $a*\alpha1+b*\alpha2+c*\alpha3$.

Please refer to FIG. 1 again. The non-linear optical device 150 is coupled to the second optical device group 130 and the light receiver device 160, and is configured to convert the optical signals received from the second optical device group 130 into non-linear signals. In some embodiments, the non-linear optical device 150 can be implemented with non-linear optical fibers, non-linear waveguides, other similar optical components or any combination of the above.

The light receiver device 160 is coupled to the non-linear optical device 150, and is configured to convert the non-linear signals received from the non-linear optical device 150 into digital signals DIG1-DIG4. In some embodiments, the light receiver device 160 can be implemented with amplifiers, attenuators, analog-to-digital converters, other similar components or any combination of the above.

In some embodiments, the non-linear optical device 150 and/or the optical combiner device 133 in the optical circuit system 100 can be omitted. In other words, the light receiver device 160 may directly receive the plurality of second optical signals from the plurality of second optical devices, thereby generating the digital signals DIG1-DIG4.

It should be noted that the numbers of the first optical device, the second optical device, the electrochromic glass EG, the optical signal and the digital signal in the optical device in FIGS. 1-3B are only examples, and are not intended to limit the present disclosure. Other numbers of the first optical device, the second optical device, the electrochromic glass EG, the optical signal and the digital signal in the optical device are within the scope of the present disclosure.

Figure 4:
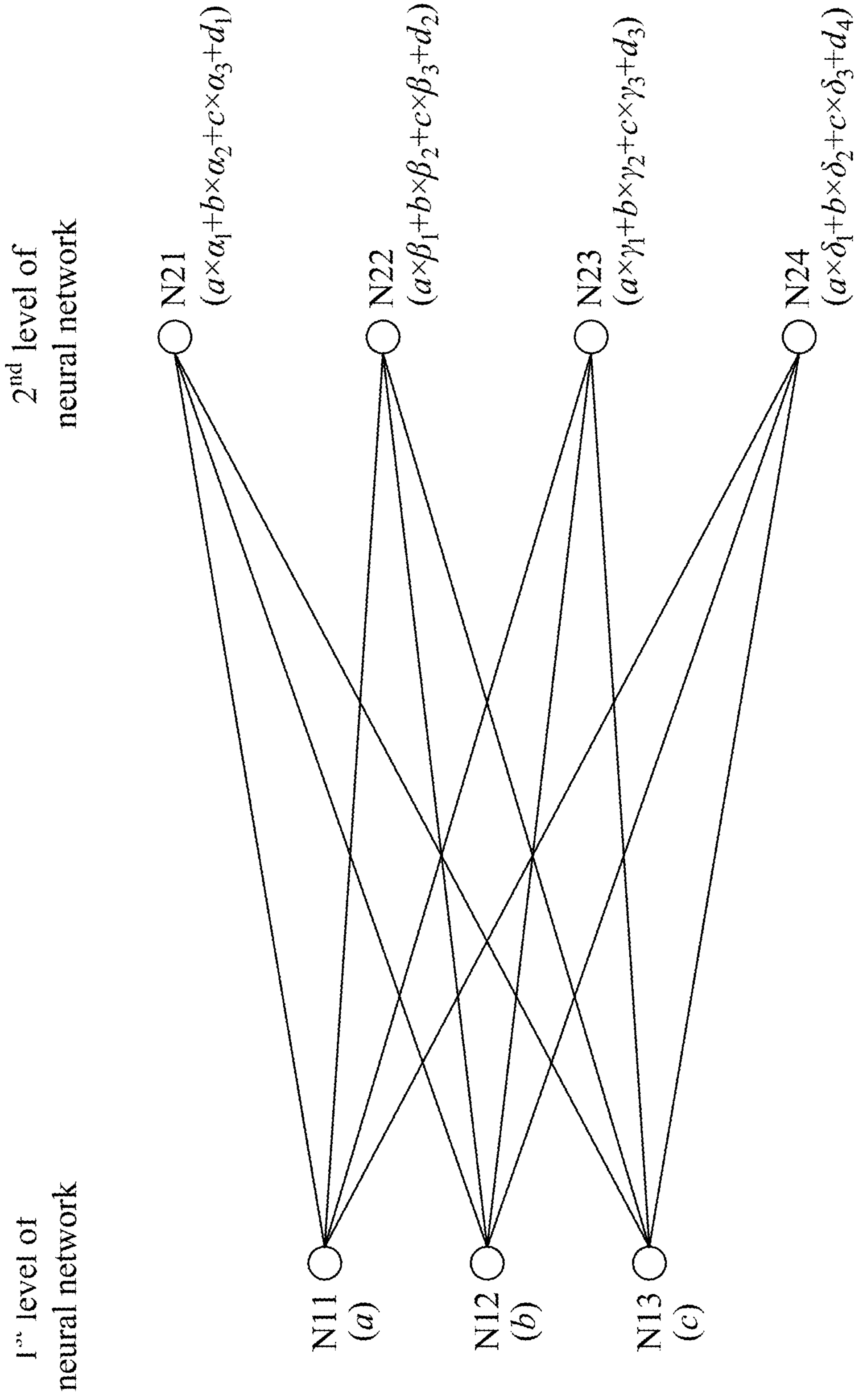
FIG. 4 is a circuit diagram of a neural network in accordance with some embodiments of the present disclosure.

Through the transmission and combination of the optical signals of the optical circuit system 100, the computing between multiple neurons at two levels of a neural network can be realized. Please refer to FIG. 4. FIG. 4 is a circuit diagram of a neural network in accordance with some embodiments of the present disclosure.

In some embodiments, the first optical devices 120A, 120B and 120C in FIG. 1 respectively correspond to neurons N11, N12 and N13 of the first level of the neural network in FIG. 4, wherein the light intensities of the first optical signals OS_1A, OS_1B and OS_1C generated by the first optical devices 120A, 120B and 120C (i.e., a, b and c) respectively correspond to the data stored in the neurons N11, N12 and N13.

On the other hand, the second optical devices 130A, 130B, 130C and 130D in FIG. 1 respectively correspond to neurons N21, N22, N23 and N24 of the second level of the neural network in FIG. 4, wherein the light intensities of the combined light signals generated by the second optical devices 130A, 130B, 130C and 130D respectively correspond to the data stored in neurons N21, N22, N23 and N24. Take the instance in FIG. 3B as an example, the second optical device 130A generates the combined optical signal OS_2A with the light intensity of $a*\alpha1+b*\alpha2+c*\alpha3+d$. This light intensity corresponds to the data stored in the neuron N21 of the second level of the neural network.

Figure 5A:
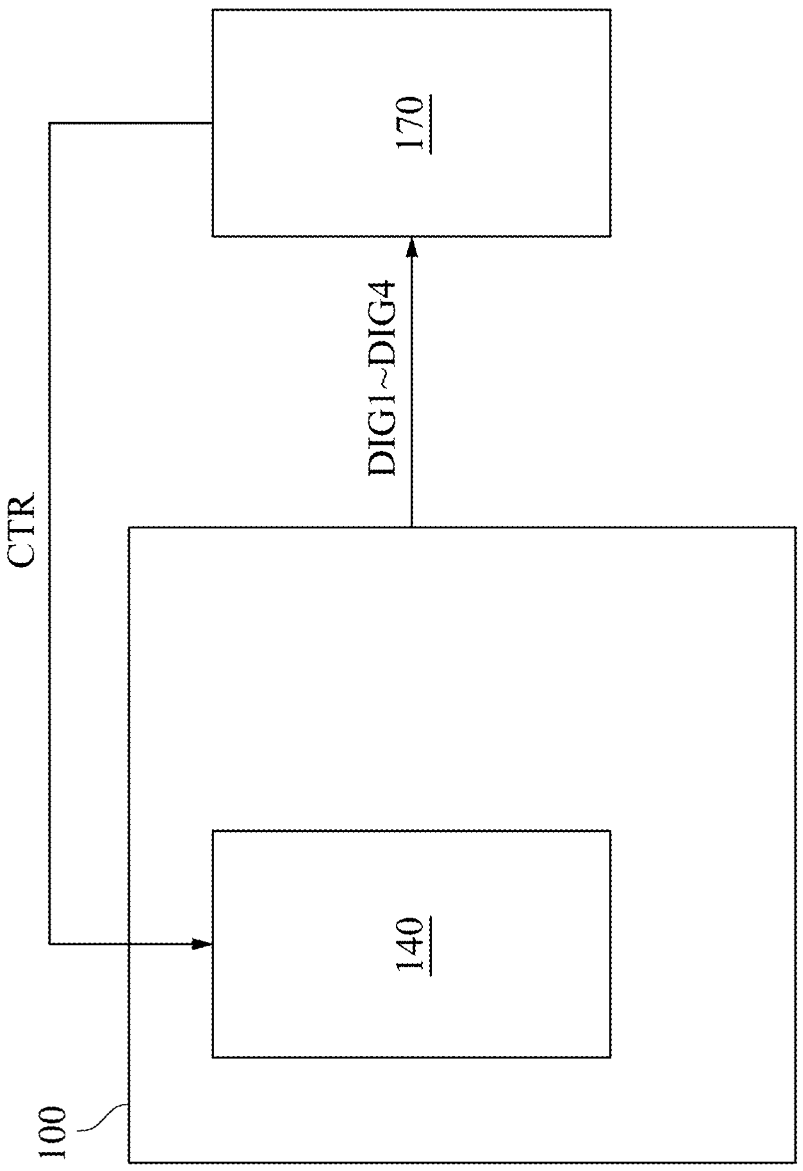
FIG. 5A is a functional block diagram of an optical circuit system in accordance with some embodiments of the present disclosure.

The digital signals DIG1-DIG4 generated by the optical circuit system 100 can be received by a computing device (e.g., a central processing unit (CPU)), and then the data of a corresponding level of the neural network can be calculated. In addition, by transmitting the digital signals DIG1-DIG4 to the power supply device 140, the optical circuit system 100 can also implement the computing between levels of the neural network. Please refer to FIG. 5A. FIG. 5A is a functional block diagram of the optical circuit system 100 in accordance with some embodiments of the present disclosure. It should be noted that for the sake of brevity, some components of the optical circuit system 100 are omitted in FIG. 5A.

In the embodiment of FIG. 5A, the optical circuit system 100 transmits the generated digital signals DIG1-DIG4 to the computing device 170 for computing the neuron data of corresponding level of the neural network. In addition, the computing device 170 is further coupled to the power supply device 140 of the optical circuit system 100 and is configured to generate a corresponding control command CTR based on the digital signals DIG1-DIG4, so as to adjust the supply voltages provided by the power supply device 140, thereby adjusting the plurality of transparency parameters of the first optical device group 120 and the second optical device group 130 and further generating new digital signals DIG1-DIG4.

Through the above feedback operation, the optical circuit system 100 can perform the computing of multiple levels of the neural network. For example, in the first operation, the first optical device group 120 and the second optical device group 130 respectively correspond to the first level and the second level of the neural network; in the second operation, with the computing device controlling the supply voltages, the first optical device group 120 and the second optical device group 130 can respectively correspond to the second and third levels of the neural network; in the third operation, with the computing device controlling the supply voltages again, the first optical device group 120 and the second optical device group 130 can respectively correspond to the third and fourth levels of the neural network, and so on.

Figure 5B:
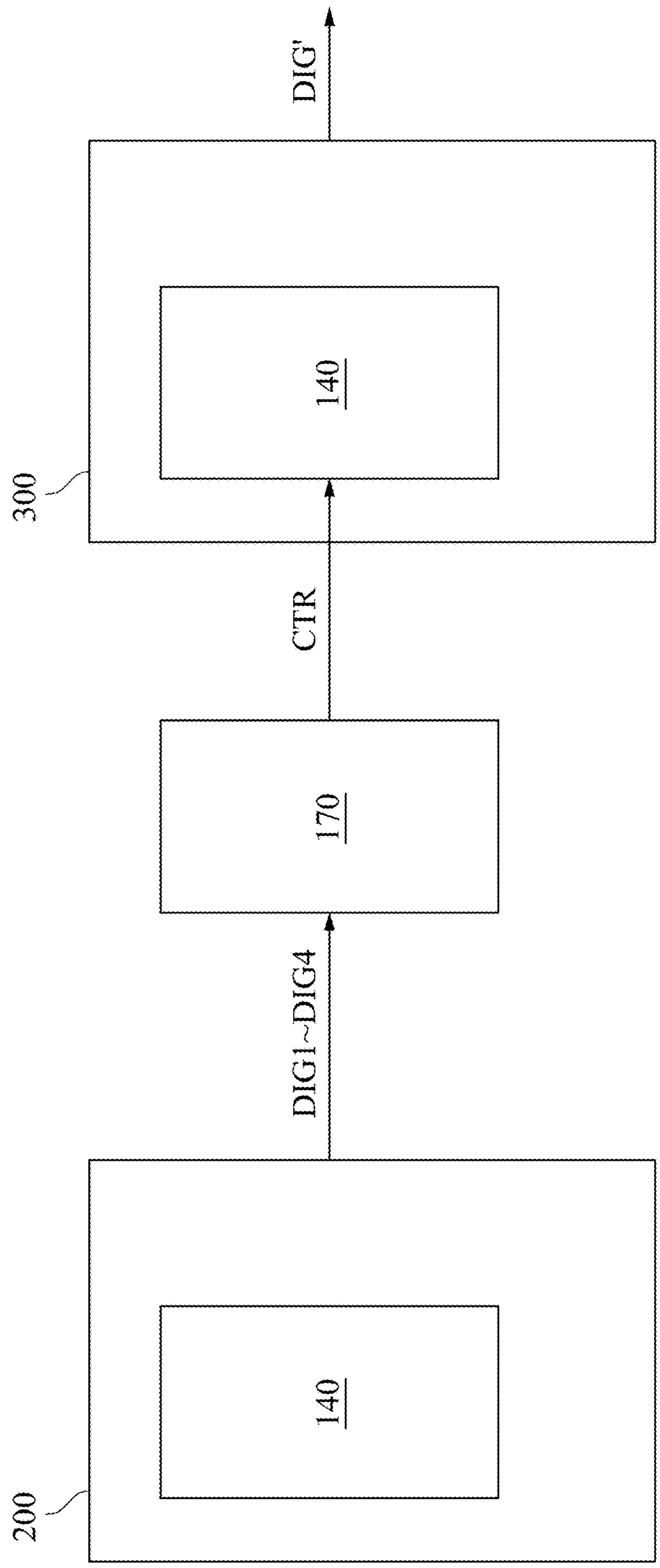
FIG. 5B is a functional block diagram of an optical circuit system in accordance with some embodiments of the present disclosure.

In some embodiments, the optical circuit system 100 may comprise a plurality of sub-systems, and implement the computing of multiple levels of the neural network through these sub-systems. Please refer to FIG. 5B. FIG. 5B is a functional block diagram of the optical circuit system 100 in accordance with some embodiments of the present disclosure.

In the embodiment of FIG. 5B, the optical circuit system 100 comprises sub-systems 200 and 300. Each of the sub-systems 200 and 300 comprises the components of the optical circuit system 100 as shown in FIG. 1, and thus the internal structures of the sub-systems 200 and 300 are not repeated here. It should be noted that for the sake of brevity, some components of the sub-systems 200 and 300 are omitted in FIG. 5B.

Operationally, first, a plurality of transparency parameters are controlled by the power supply device 140 of the sub-system 200. The first optical device group and the second optical device group of the sub-system 200 respectively correspond to the first level and second level of the neural network. Next, the sub-system 200 transmits the generated digital signals DIG1-DIG4 to the computing device 170. Based on the digital signals DIG1-DIG4, the computing device 170 will send a control command to the power supply device 140 of the sub-system 300 to adjust the supply voltages provided by the power supply device 140 of the sub-system 300, thereby adjusting the plurality of transparency parameters of the sub-system 300, so as to make the first optical device group and the second optical device group of the sub-system 300 respectively correspond to the second level and third level of the neural network, and generate a new digital signal DIG'. Through the connection of the aforementioned sub-systems, the optical circuit system 100 can perform the computing of multiple levels of the neural network.

In some embodiments, the computing device 170 between the sub-systems 200 and 300 in FIG. 5B can be omitted. Therefore, the sub-systems 200 will provide the generated optical signals to the sub-systems 300 directly, and the sub-systems 300 will perform the computing of the next level of the neural network based on these optical signals. In other words, there may be a computing device between the adjacent sub-systems in the optical circuit system 100 (i.e., transforming optical signals to digital signals for communication), or no computing device between the adjacent sub-systems in the optical circuit system 100 (i.e., communicating through optical signals directly).

In addition, in some embodiments not illustrated, the optical circuit system 100 may comprise more sub-systems (e.g., more than the two sub-systems in FIG. 5B), and the second optical device group of the sub-system corresponding to the uppermost level of the neural network (e.g. the sub-system 300 in FIG. 5B) is coupled to a computing device, so as to transform the optical signals generated by this sub-system to digital signals for outputting.

In some embodiments, the components of the optical circuit system 100 may be arranged on the same horizontal plane. In some embodiments, the components of the optical circuit system 100 can also be arranged on different horizontal planes, so as to achieve a three-dimensional architecture, thereby improving the node density. For example, in the optical circuit system 100, the laser projecting device 110, the first optical device group 120, the second optical device group 130, the power supply device 140, the non-linear optical device 150 and the light receiver device 160 are arranged along the horizontal direction, and the first optical devices 120A, 120B and 120C of the first optical device group 120 and the second optical devices 130A, 130B, 130C and 130D of the second optical device group 130 are arranged along the vertical direction, therefore achieving a three-dimensional architecture.

Figure 6:
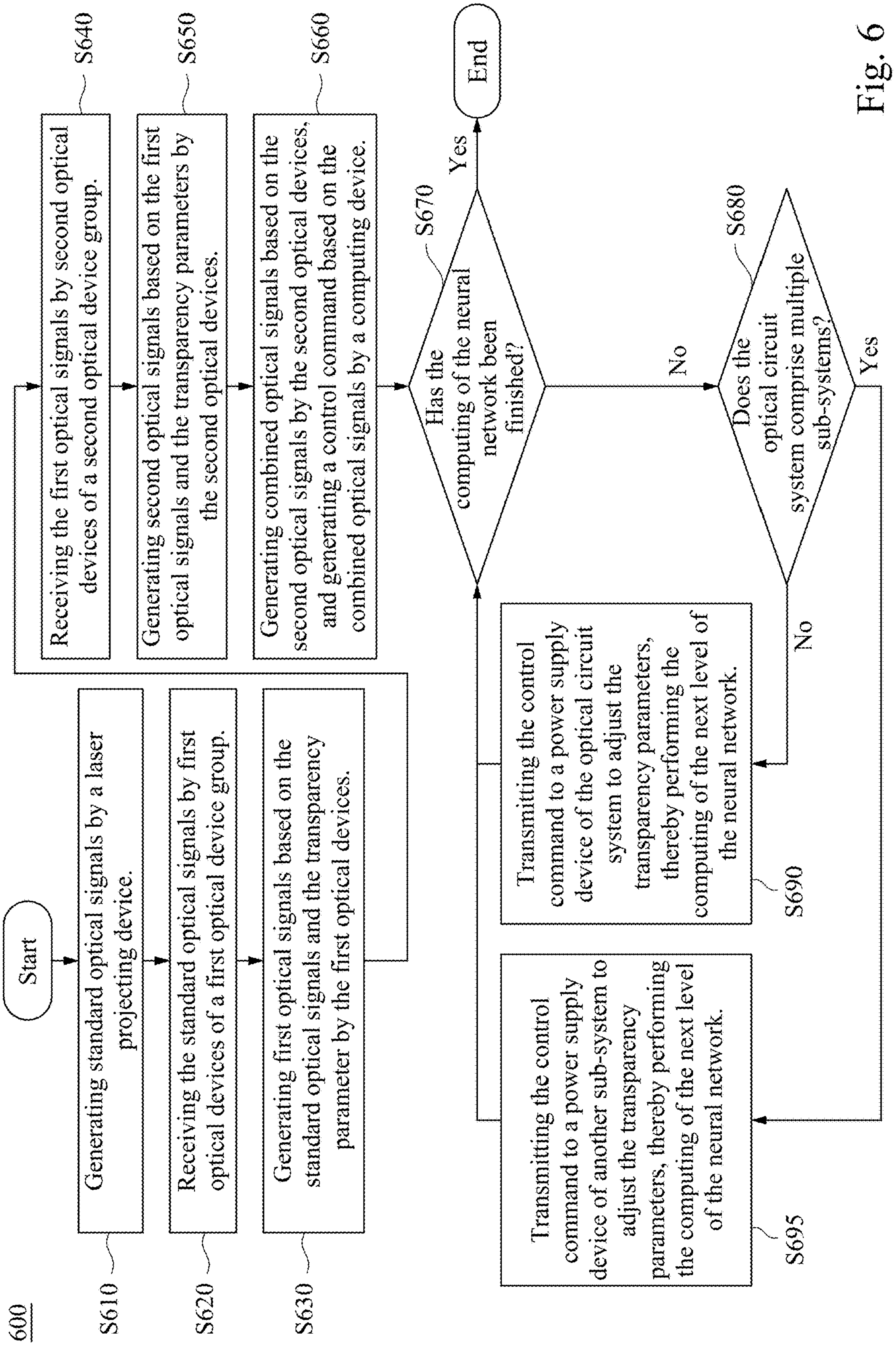
FIG. 6 is a flowchart of an optical communication method in accordance with some embodiments of the present disclosure.

FIG. 6 is a flowchart of an optical communication method 600 in accordance with some embodiments of the present disclosure. In some embodiments, the optical communication method 600 is configured to control an optical circuit system (e.g., the optical circuit system 100) to perform neural network computing, and the optical communication method 600 comprises steps S610, S620, S630, S640, S650, S660, S670, S680, S690 and S695.

In step S610, a plurality of standard optical signals are generated by a laser projecting device of the optical circuit system. Next, step S620 will be performed.

In step S620, the plurality of standard optical signals are received by a plurality of first optical devices of a first optical device group of the optical circuit system, wherein each of the first optical devices has a transparency parameter. Next, step S630 will be performed.

In step S630, a plurality of first optical signals are generated by the plurality of first optical devices, based on the plurality of standard optical signals and the transparency parameter. Next, step S640 will be performed.

In step S640, the plurality of first optical signals from the plurality of first optical devices are received by a plurality of second optical devices of a second optical device group of the optical circuit system, wherein each of the second optical devices has a plurality of transparency parameters. Next, step S650 will be performed.

In step S650, a plurality of second optical signals are generated by the plurality of second optical devices, based on the plurality of first optical signals and the plurality of transparency parameters. Next, step S660 will be performed.

In step S660, a plurality of combined optical signals are generated by the plurality of second optical devices, based on the plurality of second optical signals, and a control command is generated by a computing device based on the plurality of combined optical signals. Next, step S670 will be performed.

In step S670, whether the optical circuit system has completed the computing corresponding to all levels of the neural network is determined. If the optical circuit system has not completed the computing corresponding to all levels of the neural network, step S680 will be performed.

In step S680, whether the optical circuit system comprises multiple sub-systems is determined. If the optical circuit system does not comprise multiple sub-systems (e.g., the embodiment in FIG. 5A), step S690 will be performed; if the optical circuit system comprises multiple sub-systems (e.g., the embodiment in FIG. 5B), step S695 will be performed.

In step S690, the control command generated by the computing device based on the plurality of combined optical signals is transmitted to a power supply device of the optical circuit system, so as to adjust the plurality of transparency parameters of the optical circuit system, thereby performing the computing of the next level of the neural network. Next, step S670 will be performed again.

In step S695, the control command generated by the computing device based on the plurality of combined optical signals of one of the sub-systems is transmitted to a power supply device of another sub-system, so as to adjust the plurality of transparency parameters of the another sub-system, thereby performing the computing of the next level of the neural network. Next, step S670 will be performed again.

It should be noted that the number and order of steps of the optical communication method 600 of the present disclosure are only examples, and are not intended to limit the present disclosure. Other numbers and orders of steps are within the scope of the present disclosure. In some embodiments, steps S670, S680, S690 and S695 may be omitted.

Through the optical circuit system 100 and the optical communication method 600 of the present disclosure, the computing of neural networks can be implemented with optical circuits. Compared with traditional circuits connected through multiple conductive lines, since the optical circuit system 100 of the present disclosure uses optical signals, the equivalent resistance on the signal transmission path can be reduced, therefore improving the reliability and reducing signal delay of the circuit without significantly reducing the energy efficiency of the circuit. In addition, unlike physical conductive lines, which have routing overlap and obstruction problems, the transmission path of light can be freely interspersed. Therefore, the optical circuit system 100 of the present disclosure can also simplify the routing of circuit and reduce design complexity.

The above are preferred embodiments of the present disclosure. It will be apparent to those skilled in the art that various modifications and variations can be made to the structure of the present disclosure without departing from the scope or spirit of the present disclosure. In view of the foregoing, it is intended that the present disclosure cover modifications and variations of this disclosure provided they fall within the scope of the following claims and their equivalents.

What is claimed is:

1. An optical circuit system, configured to perform a neural network computing and comprising:

a laser projecting device, configured to generate a plurality of standard optical signals;

a first optical device group, comprising a plurality of first optical devices and configured to receive the plurality of standard optical signals from the laser projecting device, wherein each of the plurality of first optical devices has a transparency parameter and is configured to generate a plurality of first optical signals based on the plurality of standard optical signals and the transparency parameter; and a second optical device group, comprising a plurality of second optical devices and configured to receive the plurality of first optical signals from the first optical device group, wherein each of the plurality of second optical devices has a plurality of transparency parameters and is configured to generate a plurality of second optical signals based on the plurality of first optical signals and the plurality of transparency parameters, thereby generating a combined optical signal, wherein a light intensity of the plurality of first optical signals generated by one of the plurality of first optical devices is related to one of a plurality of neuronal data of a first level of a neural network, and a light intensity of the plurality of second optical signals generated by one of the plurality of second optical devices is related to one of a plurality of neuronal data of a second level of the neural network.

2. The optical circuit system of claim 1, wherein the plurality of transparency parameters of the plurality of first optical devices are different from each other, and the transparency parameters of any one of the plurality of second optical devices are different from each other.

3. The optical circuit system of claim 1, further comprising a power supply device, wherein the power supply device is coupled to the plurality of first optical devices and the plurality of second optical devices, and is configured to provide a plurality of supply voltages to the plurality of first optical devices and the plurality of second optical devices respectively, so as to adjust the plurality of transparency parameters of the plurality of first optical devices and the plurality of second optical devices.

4. The optical circuit system of claim 3, wherein each of the plurality of second optical devices comprises an optical combiner device configured to generate the combined optical signal based on the plurality of second optical signals of the one of the plurality of second optical devices.

5. The optical circuit system of claim 4, wherein a light intensity of the combined optical signal is related to a sum of light intensities of the plurality of second optical signals generated by the one of the plurality of second optical devices, and the sum of the light intensities of the plurality of second optical signals is equal to a sum of products of light intensities of the plurality of first optical signals and the plurality of transparency parameters of the one of the plurality of second optical devices respectively.

6. The optical circuit system of claim 4, wherein the laser projecting device is further configured to generate a direct optical signal to the optical combiner device, and wherein a light intensity of the combined optical signal is related to a sum of light intensities of the plurality of second optical signals generated by the one of the plurality of second optical devices, and the sum of the light intensities of the plurality of second optical signals is equal to a sum of a light intensity of the direct optical signal and products of light intensities of the plurality of first optical signals and the plurality of transparency parameters of the one of the plurality of second optical devices respectively.

7. The optical circuit system of claim 4, wherein the optical combiner device and the power supply device are coupled to a computing device, and the computing device is configured to generate a control command to the power supply device based on the combined optical signal, so as to adjust the plurality of supply voltages.

8. An optical circuit system, configured to perform a neural network computing and comprising:

a first level sub-system; and a second level sub-system, coupled to the first level sub-system, wherein each of the first level sub-system and the second level sub-system comprises:

a laser projecting device, configured to generate a plurality of standard optical signals;

a first optical device group, comprising a plurality of first optical devices and configured to receive the plurality of standard optical signals from the laser projecting device, wherein each of the plurality of first optical devices has a transparency parameter and is configured to generate a plurality of first optical signals based on the plurality of standard optical signals and the transparency parameter; and a second optical device group, comprising a plurality of second optical devices and configured to receive the plurality of first optical signals from the first optical device group, wherein each of the plurality of second optical devices has a plurality of transparency parameters and is configured to generate a plurality of second optical signals based on the plurality of first optical signals and the plurality of transparency parameters, thereby generating a combined optical signal, wherein a light intensity of the plurality of first optical signals generated by the plurality of first optical devices of the second level sub-system is related to a light intensity of the plurality of second optical signals generated by the plurality of second optical devices of the first level sub-system, wherein a light intensity of the plurality of first optical signals generated by one of the plurality of first optical devices of the first level sub-system is related to one of a plurality of neuronal data of a first level of a neural network, wherein a light intensity of the plurality of second optical signals generated by one of the plurality of second optical devices of the first level sub-system and a light intensity of the plurality of first optical signals generated by one of the plurality of first optical devices of the second level sub-system are related to one of a plurality of neuronal data of a second level of the neural network, and wherein a light intensity of the plurality of second optical signals generated by one of the plurality of second optical devices of the second level sub-system is related to one of a plurality of neuronal data of a third level of the neural network.

9. The optical circuit system of claim 8, wherein the plurality of transparency parameters of the plurality of first optical devices of the first level sub-system are different from each other, the transparency parameters of the plurality of first optical devices of the second level sub-system are different from each other, the transparency parameters of any one of the plurality of second optical devices of the first level sub-system are different from each other, and the transparency parameters of any one of the plurality of second optical devices of the second level sub-system are different from each other.

10. The optical circuit system of claim 8, wherein each of the first level sub-system and the second level sub-system comprises a power supply device, wherein the power supply device is coupled to the plurality of first optical devices and the plurality of second optical devices, and is configured to provide a plurality of supply voltages to the plurality of first optical devices and the plurality of second optical devices respectively, so as to adjust the plurality of transparency parameters of the plurality of first optical devices and the plurality of second optical devices.

11. The optical circuit system of claim 10, wherein each of the plurality of second optical devices of the first level sub-system and the second level sub-system comprises an optical combiner device configured to generate the combined optical signal based on the plurality of second optical signals of the one of the plurality of second optical devices.

12. The optical circuit system of claim 11, wherein a light intensity of the combined optical signal is related to a sum of light intensities of the plurality of second optical signals generated by the one of the plurality of second optical devices, and the sum of the light intensities of the plurality of second optical signals is equal to a sum of products of light intensities of the plurality of first optical signals and the plurality of transparency parameters of the one of the plurality of second optical devices respectively.

13. The optical circuit system of claim 11, wherein the laser projecting device of the first level sub-system and the second level sub-system is further configured to generate a direct optical signal to the optical combiner device, and wherein a light intensity of the combined optical signal is related to a sum of light intensities of the plurality of second optical signals generated by the one of the plurality of second optical devices, and the sum of the light intensities of the plurality of second optical signals is equal to a sum of a light intensity of the direct optical signal and products of light intensities of the plurality of first optical signals and the plurality of transparency parameters of the one of the plurality of second optical devices respectively.

14. The optical circuit system of claim 11, wherein the optical combiner device of the first level sub-system and the power supply device of the second level sub-system are coupled to a computing device, and the computing device is configured to generate a control command to the power supply device of the second level sub-system based on the combined optical signal of the optical combiner device of the first level sub-system, so as to adjust the plurality of supply voltages of the second level sub-system.

15. An optical communication method configured to control an optical circuit system to perform a neural network computing, comprising:

generating, by a laser projecting device of the optical circuit system, a plurality of standard optical signals;

receiving, by a plurality of first optical devices of a first optical device group of the optical circuit system, the plurality of standard optical signals, wherein each of the plurality of first optical devices has a transparency parameter;

generating, by the plurality of first optical devices, a plurality of first optical signals based on the plurality of standard optical signals and the transparency parameter;

receiving, by a plurality of second optical devices of a second optical device group of the optical circuit system, the plurality of first optical signals, wherein each of the plurality of second optical devices has a plurality of transparency parameters;

generating, by the plurality of second optical devices, a plurality of second optical signals based on the plurality of first optical signals and the plurality of transparency parameters; and generating, by the plurality of second optical devices, a plurality of combined optical signals based on the plurality of second optical signals, wherein a light intensity of the plurality of first optical signals generated by one of the plurality of first optical devices is related to one of a plurality of neuronal data of a first level of a neural network, and a light intensity of the plurality of second optical signals generated by one of the plurality of second optical devices is related to one of a plurality of neuronal data of a second level of the neural network.

16. The optical communication method of claim 15, further comprising:

providing, by a power supply device of the optical circuit system, a plurality of supply voltages to the plurality of first optical devices and the plurality of second optical devices respectively, so as to adjust the plurality of transparency parameters of the plurality of first optical devices and the plurality of second optical devices.

17. The optical communication method of claim 16, wherein generating, by the plurality of second optical devices, the plurality of combined optical signals, based on the plurality of second optical signals comprises:

receiving, by an optical combiner device of each second optical device, the plurality of second optical signals; and summing up, by the optical combiner device, light intensities of the plurality of second optical signals, so as to generate the plurality of combined optical signals, wherein a sum of the light intensities of the plurality of second optical signals is equal to a sum of products of light intensities of the plurality of first optical signals and the plurality of transparency parameters of the one of the plurality of second optical devices respectively.

18. The optical communication method of claim 16, further comprising:

generating, by the laser projecting device, a direct optical signal to an optical combiner device of the plurality of second optical devices, wherein generating, by the plurality of second optical devices, the plurality of combined optical signals, based on the plurality of second optical signals comprises:

receiving, by the optical combiner device of each second optical device, the plurality of second optical signals and the direct optical signal; and summing up, by the optical combiner device, light intensities of the plurality of second optical signals and a light intensity of the direct optical signal, so as to generate the plurality of combined optical signals, wherein a sum of the light intensities of the plurality of second optical signals is equal to a sum of products of light intensities of the plurality of first optical signals and the plurality of transparency parameters of the one of the plurality of second optical devices respectively.

19. The optical communication method of claim 18, further comprising:

generating, by a computing device coupled to the optical circuit system, a control command based on the plurality of combined optical signals, to the power supply device; and adjusting, by the power supply device, the plurality of supply voltages based on the control command.

20. The optical communication method of claim 18, further comprising:

generating, by a computing device coupled to the optical circuit system, a control command based on the plurality of combined optical signals, to the power supply device;

adjusting, by the power supply device, the plurality of supply voltages that are provided to a third optical device group and a fourth optical device group of the optical circuit system based on the control command;

receiving, by a plurality of third optical devices of the third optical device group, the plurality of supply voltages and the plurality of standard optical signals, so as to generate a plurality of third optical signals; and receiving, by a plurality of fourth optical devices of the fourth optical device group, the plurality of third optical signals and the plurality of supply voltages, so as to generate a plurality of fourth optical signals, wherein a light intensity of the plurality of third optical signals is related to the plurality of combined optical signals, and related to the one of the plurality of neuronal data of the second level of the neural network, and wherein a light intensity of the plurality of fourth optical signals is related to one of a plurality of neuronal data of a third level of the neural network.

* * * * *